(12) United States Patent
Bastel et al.

(10) Patent No.: US 7,238,112 B2
(45) Date of Patent: *Jul. 3, 2007

(54) TORSIONAL-VIBRATION DAMPER

(75) Inventors: Norbert Bastel, Obernhausen (DE); Juergen Kroll, Ortelsburger (DE); Till Ebner, Pfungstadt (DE)

(73) Assignee: BorgWarner. Inc., Auburn Hills, MI (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/886,278

(22) Filed: Jul. 7, 2004

(65) Prior Publication Data

US 2005/0020365 A1  Jan. 27, 2005

(30) Foreign Application Priority Data

Jul. 7, 2003 (EP) ................................ 03015283
Sep. 9, 2003 (EP) ................................ 03020332

(51) Int. Cl.
*F16F 15/129* (2006.01)
(52) U.S. Cl. .................................... 464/68.4
(58) Field of Classification Search ............. 464/68.4, 464/68.41; 192/214.1, 214
See application file for complete search history.

(56) References Cited

U.S. PATENT DOCUMENTS

| | | | |
|---|---|---|---|
| 2,855,767 A | | 10/1958 | Ahlen |
| 4,190,142 A | * | 2/1980 | Berlioux .................. 192/214.1 |
| 4,353,444 A | | 10/1982 | Bionaz |
| 4,626,226 A | * | 12/1986 | Kajikawa et al. .......... 464/64.1 |
| 4,697,684 A | * | 10/1987 | Maycock et al. ..... 192/214.1 X |
| 4,787,612 A | * | 11/1988 | Ball et al. ............ 464/68.41 X |
| 4,871,342 A | | 10/1989 | Boss et al. |
| 5,186,293 A | * | 2/1993 | Fujimoto ................. 192/214 X |
| 5,826,689 A | * | 10/1998 | Bochot ................... 464/68.4 X |
| 6,110,046 A | * | 8/2000 | Rohs et al. .............. 464/68.41 |
| 6,416,416 B1 | * | 7/2002 | Rohs et al. .............. 464/68.41 |
| 6,536,575 B1 | | 3/2003 | Lory et al. |

FOREIGN PATENT DOCUMENTS

| | | |
|---|---|---|
| DE | 39 09 892 | 10/1989 |
| DE | 43 07 133 A1 | 10/1993 |
| DE | 197 16 487 | 6/1998 |
| DE | 100 05 996 | 9/2000 |
| DE | 100 37 646 | 2/2002 |

(Continued)

*Primary Examiner*—Greg Binda
(74) *Attorney, Agent, or Firm*—Greg Dziegielewski; Bliss McGlynn, P.C.

(57) ABSTRACT

A torsional-vibration damper includes a primary element operatively connected for rotation with a prime mover and a secondary element operatively connected with the input to a transmission. A spring mechanism is operatively disposed between and adapted to control the primary element and the secondary element in damped torque translational relationship. The torsional-vibration damper also includes a friction device having a plurality of fiction blocks that frictionally join the primary element with the secondary element. The secondary element includes an output-side member having a first axial ridge and a drive-side member having a second axial ridge. The output-side member and the drive-side member operatively encompass the primary element and the first axial ridge overlaps the second axial ridge. The first and the second axial ridges thereby cooperate to provide a double layer of radial support for the spring mechanism.

8 Claims, 9 Drawing Sheets

FOREIGN PATENT DOCUMENTS

| | | |
|---|---|---|
| DE | 101 15 454 A1 | 8/2002 |
| DE | 43 45 542 | 2/2003 |
| DE | 101 49 704 A1 | 4/2003 |
| EP | 0 610 979 A1 | 8/1994 |
| EP | 1 174 633 | 1/2002 |
| EP | 1 176 339 A2 | 1/2002 |
| EP | 1 371 875 | 12/2003 |
| FR | 2 749 634 | 12/1997 |

* cited by examiner

TORSIONAL-VIBRATION DAMPER

BACKGROUND OF THE INVENTION

1. Field of the Invention

The present invention relates, generally, to a torsional-vibration damper for the vehicle.

2. Description of the Related Art

A torsional-vibration damper is, generally, a type of elastic coupling disposed between two components of a drive train of a vehicle, for example, between an internal-combustion engine and a transmission. Such devices generally reduce or otherwise prevent vibrations from being transmitted from the engine to other parts of the drive train.

The basic embodiment of a torsional-vibration damper includes a primary element and a secondary element that can be coupled to each other by a spring device and are limited in movement in relation to each other about a rotational axis. The spring device advantageously includes a plurality of springs disposed on a radial arc spaced relative to the rotational axis and, preferably, at a certain uniform distance from each other. The springs, or a sequence of multiple springs, if applicable, are then connected to the primary element on one side of the springs and to the secondary element on the other side of the springs. Torque is transmitted through the spring coupling, and, as a result of the spring characteristic, a certain additional damping effect is achieved.

When torsional-vibration dampers are used in the drive train, however, it is necessary to have a high moment of friction in the drive train to decrease the vibration amplitudes in the resonance range. Unfortunately, this causes the transmission characteristic to deteriorate in higher speed range.

In response to this problem, a torsional-vibration damper has been developed in the related art that includes primary and secondary elements coupled not only by the spring device, but additionally via a friction device whose damping effect can be controlled and adjusted by a special force-generating device. The friction device can also be engaged and disengaged in the manner of a clutch.

Although torsional-vibration dampers known in the related art are basically effective in solving this problem, they still have certain disadvantages. In particular, they are often physically complex and also require a separate control system. The control system operatively controls the friction device to selectively provide the desired controlled moment of friction given the specific operating conditions at the time. The inherent complexity of both the friction device and its control system generally leads to increased costs associated with torsional dampers of this type. Often, the manufacturing costs of such torsional dampers are considered too high for many applications. Furthermore, these types of systems suffer from having secondary elements with insufficient radial strength to properly support the centrifugal forces generated as the spring device operates. This causes deflection of the elements during operation that results in a power loss and possible damage to the torsional damper.

Thus, there remains a need in the art for a torsional-vibration damper having a friction device that provides a controlled moment of friction and that is not too expensive to manufacture. In particular, there remains a need in the art for torsional-vibration damper that employs a simple friction device that provides a damping effect that does not need a separate control system and can be produced in a cost-effective manner. There is also a need in the art for a torsional-vibration damper of this type that has secondary elements that are stronger than those typically employed in the related art so that they are capable of withstanding the centrifugal forces generated at the spring damping mechanism.

SUMMARY OF THE INVENTION

The present invention overcomes the disadvantages in the related art in a torsional-vibration damper rotatably supported for translating torque between a prime mover and the input of a transmission that includes a primary element operatively connected for rotation with the power take off of a prime mover, and a secondary element operatively connected for rotation with the input to a transmission. A spring mechanism is operatively disposed between the primary element and the secondary element that is adapted to operatively couple the primary element to the secondary element in damped torque translational relationship. The torsional-vibration damper also includes a friction device having a plurality of fiction blocks that are each operatively supported between the primary element and the secondary element such that they frictionally join the primary element with the secondary element. The secondary element includes an output-side member having a first axial ridge and a drive-side member having a second axial ridge. The output-side member is mounted to the drive-side member such that the output-side member and the drive-side member operatively encompass the primary element and the first axial ridge overlaps the second axial ridge. The first and the second axial ridges cooperate to provide a double layer of radial support for the spring mechanism.

One advantage of the torsional-vibration damper of the present invention is that the double layering of the members of the secondary element provides a particularly stiff and dimensionally stable secondary element that is able to withstand the centrifugal forces generated at the torsional damper.

Another advantage of the torsional-vibration damper of the present invention is that the double layering of the second element is simple and inexpensive to produce.

Also, the friction device of the torsional vibration damper of the present invention requires only a few separate components and is simple and inexpensive to produce. Furthermore, by varying the size of the friction elements the predetermined relative friction moment force of the friction device is easily changeable in production.

Other objects, features, and advantages of the present invention will be readily appreciated, as the same becomes better understood while reading the subsequent description taken in conjunction with the accompanying drawings.

DETAILED DESCRIPTION OF THE INVENTION

Figures 1A, 1B:
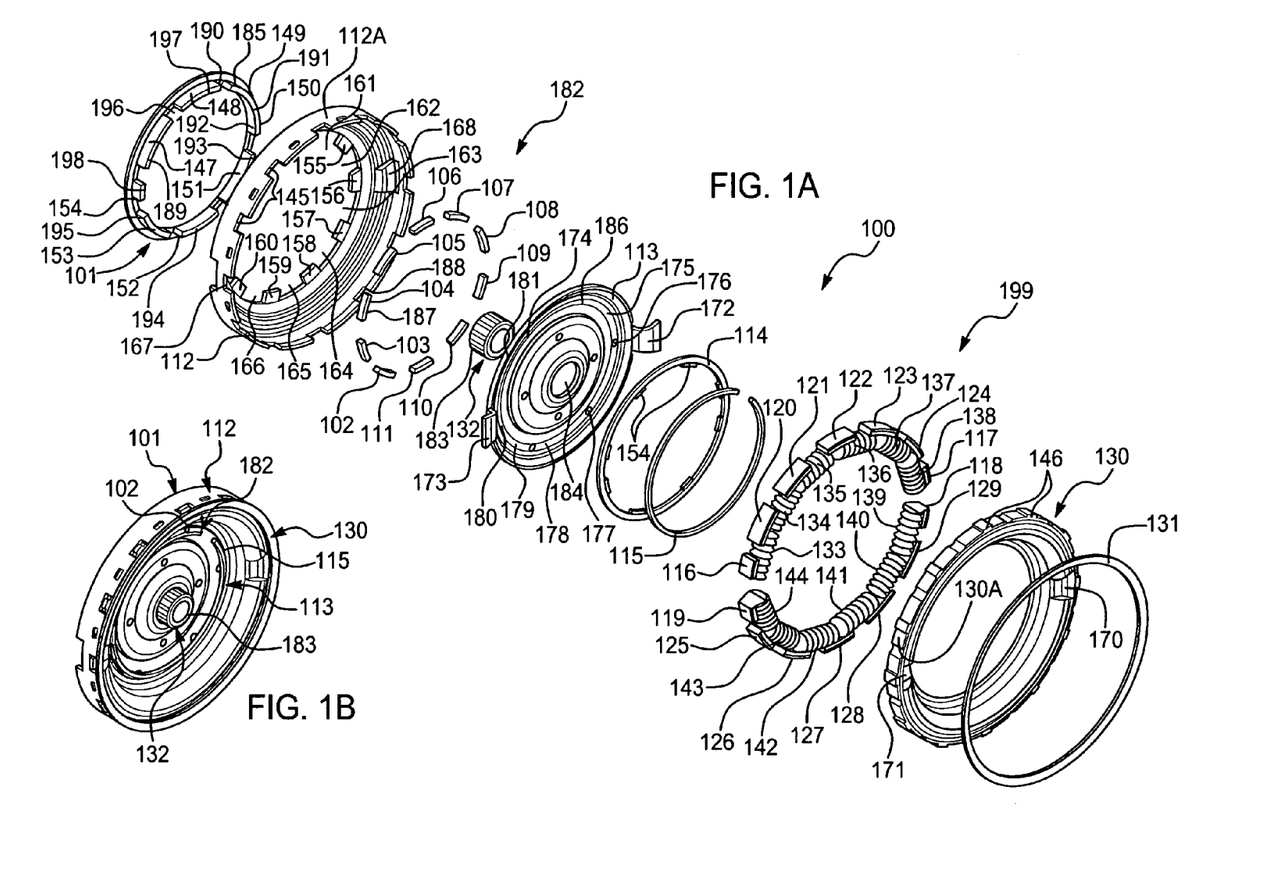
FIG. 1A is an exploded view of one embodiment of a torsional-vibration damper of the present invention.
FIG. 1B is a perspective view of the torsional-vibration damper of the present invention as shown in FIG. 1A.
Figure 2:
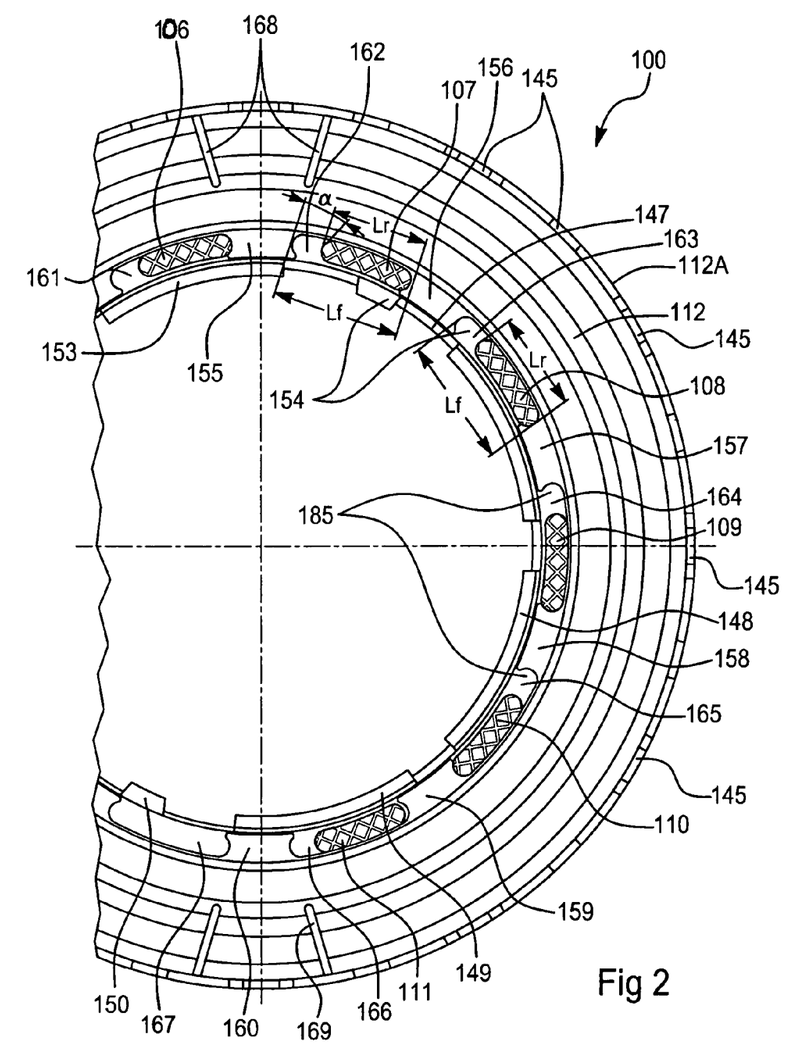
FIG. 2 is a partial top view of a drive-side holding plate that may be employed with the torsional-vibration damper of the present invention as shown in FIG. 1A.

Referring now to FIGS. 1A, 1B, and 2, where like numerals are used to designate like structure, one embodiment of the torsional vibration damper of the present invention is generally indicated at 100. In its operative mode, the torsional-vibration damper 100 is rotatably supported for translating torque between a prime mover and the input of a transmission. The torsional oscillation damper 100 includes a primary element, a secondary element and a damping mechanism. The primary element is illustrated herein as a hub plate 113, which is adapted to be operatively connected for rotation with the power take off of a prime mover (not shown). For purposes of illustration, the output shaft of such a device is generally indicated at 132 by a portion of a splined shaft 183. The splined shaft 183 may be operatively connected to an internal-combustion engine or other motor, for example. The splined shaft 183 of the drive device is received and retained by an axially centered opening 184 in the hub plate 113 that is cooperatively splined.

The secondary element includes a first member and a second member. The first and second members are holding members also referred to as plates. More specifically, the secondary element of the torsional-vibration damper 100 of the present invention includes a drive-side holding member or plate 112 and an output-side holding member or plate 130. The holding plates 112 and 130 are so named for their function of holding the damping mechanism between them and their position in the secondary element. More precisely, torque is provided to the drive-side holding plate 112 from the hub plate 113 through the damping mechanism and then delivered to a subsequent power transfer or transmission device (not shown) that is operatively connected to the output-side holding plate 130.

Referring to FIGS. 1A, 1B, and 2, the damping mechanism includes a friction device, generally indicated at 182, and a spring mechanism, generally indicated at 199. Generally speaking, the friction device 182 includes a plurality of fiction blocks that are each operatively supported between the primary element and the secondary element such that the friction blocks frictionally join the primary element with the secondary element. More specifically, the friction device 182 includes an annular ring formed generally as a disc that serves as a support member or plate 101. Along the inner circumference of the support plate 101 are axially extending ridges 147, 148, 149, 150, 151, 152, 153, and 154 that are turned radially inward at their ends to form the radial support ridges 189, 190, 191, 192, 193, 194, 195, and 196.

Formed on the inner circumference of the drive-side holding plate 112 are a series of recesses or apertures 161, 162, 163, 164, 165, 166, and 167. The formation of the apertures creates radial ridges 155, 156, 157, 158, 159, and 160. The support plate 101 is operatively disposed to the drive-side holding plate 112 such that the axially extending ridges 147, 148, 149, 150, 151, 152, 153, and 154 and the radial support ridges 189, 190, 191, 192, 193, 194, 195, and 196 of the support plate 101 fit within, and extend axially beyond the inner diameter of the radial ridges 155, 156, 157, 158, 159, and 160 of the drive-side holding plate 112.

As best shown in FIG. 2, friction blocks 102, 103, 104, 105, 106, 107, 108, 109, 110, and 111 are operatively disposed upon the axially extending ridges 147, 148, 149, 150, 151, 152, 153, and 154 of the support plate 101 so that they fit within the open areas created by the interaction of the apertures 161, 162, 163, 164, 165, 166, and 167 and the radial ridges 155, 156, 157, 158, 159, and 160 of the drive-side holding plate 112. In this manner, the friction blocks 102, 103, 104, 105, 106, 107, 108, 109, 110, and 111 can move within the apertures 161, 162, 163, 164, 165, 166, and 167 in a circumferential orientation up to the limits of the sides of the next respective radial ridge 155, 156, 157, 158, 159, or 160.

Furthermore, the disc-shaped hub plate 113 also includes a series of circumferentially oriented apertures 174, 175, 176, 177, 178, 179, 180, and 181. The hub plate 113 is operatively disposed within the drive-side holding plate 112 such that the radial support ridges 189, 190, 191, 192, 193, 194, 195, and 196 of the support plate 101 are received by and extend through the hub plate apertures 174, 175, 176, 177, 178, 179, 180, and 181. However, the hub plate apertures 174, 175, 176, 177, 178, 179, 180, and 181 are generally slot-shaped and do not allow the friction blocks 102, 103, 104, 105, 106, 107, 108, 109, 110, and 111 to pass through. In other words, the friction blocks 102, 103, 104, 105, 106, 107, 108, 109, 110, and 111 are radially captured between support ring 101 and the hub plate 113. More specifically, the support ring 101 and the hub plate 113 have friction surfaces 185 and 186 respectively that interact with the axial ends 187 and 188 of the friction blocks 102, 103, 104, 105, 106, 107, 108, 109, 110, and 111.

To achieve the desired axial frictional interaction between the hub plate 113, the support plate 101, and friction blocks 102, 103, 104, 105, 106, 107, 108, 109, 110, and 111, the support plate 101 includes a biasing member to cause the hub plate 113 to be axially biased toward the support plate 101. In the preferred embodiment illustrated here, the biasing member is a disk spring 114 that is retained by a locking ring 115. The disk spring 114 is disposed against the hub plate 113 and includes a series of tabs 154 at its inner diameter. The series of tabs 154 are formed having a deflection toward the hub plate 113. The disk spring 114 fits within the inner diameter of the radial support ridges 189, 190, 191, 192, 193, 194, 195, and 196 of the support plate 101 that extend through the slotted hub plate apertures 174, 175, 176, 177, 178, 179, 180, and 181.

The locking ring 115 has a larger diameter than the disk spring 114 and is formed of a spring metal material having a split in its circumference. The locking ring 115 is circumferentially compressed to fit within the radial support ridges 189, 190, 191, 192, 193, 194, 195, and 196 of the support plate 101 against the disk spring 114 and then allowed to re-expand to be retained by the radial support ridges. The presence of the locking ring 115 causes the tabs 154 of the disk spring 114 to press against the hub plate 113 and provide the proper axial biasing between the hub plate 113 and support plate 101. This causes a circumferentially-resistive friction force to be present between the friction blocks 102, 103, 104, 105, 106, 107, 108, 109, 110, and 111, the hub plate 113, and the support plate 101.

The hub plate 113 can slightly twist, together with the support plate 101, in relation to the drive-side holding plate 112 by a certain angle, when the relevant friction blocks 102, 103, 104, 105, 106, 107, 108, 109, 110, 111 are not resting against their respective radial ridge 155, 156, 157, 158, 159, or 160. The angle α, as shown in FIG. 2, defines the relative distance between a free twist of the hub plate 113 and the frictionally joined support plate 101 that is possible before the drive-side holding plate 112 is influenced to move. If clearance angle α is exceeded, any further rotation requires overcoming the frictional force acting between the friction surfaces 185, 186, 187, and 188.

As shown in FIG. 2, the apertures 161, 162, 163, 164, 165, 166, and 167 have the same circumferential length $L_f$. The friction blocks 102, 103, 104, 105, 106, 107, 108, 109, 110, 111 also have the same circumferential length Lr, so that the clearance angles α are the same at each aperture 161, 162, 163, 164, 165, 166, and 167. Thus, the frictional interaction between the support plate 101 and the hub plate 113 is generally applied at the same point in the rotation of the support plate 101 and the hub plate 113 relative to the drive-side holding plate 112. However, it should be appreciated that the friction blocks 102, 103, 104, 105, 106, 107, 108, 109, 110, and 111, or the apertures 161, 162, 163, 164, 165, 166, and 167, or both may be formed having different lengths such that different clearance angles α are created. In this manner, the applied frictional forces and the point of rotation at which they occur may be designed to vary.

It should be appreciated that the material used in the production of the friction blocks discussed herein may be of any variety of resilient materials that provide an adequate transfer of frictional moment force between the primary and secondary elements. This may include any of the typical materials used with friction and abrasion pads such as layered compositions having a metallic core with organic material friction pads, for example. However, it has proven to be advantageous for the present invention to employ friction blocks that contain plastic or that are completely made of plastic. It has proven to be particularly advantageous when the friction blocks employed with the present invention contain a polyamide plastic.

Furthermore, additional benefit has been determined to arise from employing plastic friction blocks that are impregnated with reinforcing fibers. More precisely, plastic friction blocks having embedded reinforcing glass fibers have proven to provide the greatest wear-resistance and provide a high transfer of friction moment force. Therefore, in the preferred embodiment, the friction blocks employed are formed of polyamide plastic having embedded reinforcing glass fibers. Depending upon design criteria for the torsional-vibration damper of the present invention, and the conditions of the operating environment, the predetermined amount of embedded fibers used in the material composition of the friction blocks may vary. In the preferred embodiment, the predetermined amount of embedded glass reinforcing fibers used represents between 40 to 60% of the total composition of the friction blocks. A composition of 50% embedded glass fibers is optimum for most applications.

The damping mechanism of the torsional oscillation damper 100 also includes a spring mechanism 199 that is disposed between the primary element 113 and the secondary element 112, 130. The spring mechanism 199 is adapted to couple the primary element (hub plate 113) to the secondary element (drive-side and output holding plates 112 and 130) in a damped torque translational relationship. To support the spring mechanism 199, the secondary element 112, 130 includes an output-side member 130 and a drive-side member 112. The output-side member 130 is mounted to the drive-side member 112 such that the output-side member 130 and the drive-side member 112 operatively encompass the primary element 112 and provide radial support for the spring mechanism 199.

The drive-side holding plate 112 includes an axial rim 112A at its outer circumference that has a series of teeth 145. The output-side holding plate 130 also includes an axial rim 130A that is slightly larger in diameter than the axial rim 112A of the drive-side holding plate 112. The output-side holding plate 130 also includes a series of circumferential recesses 146 formed radially inside of the axial rim 130A that are complementary to the series of teeth 145 in the axial rim 112A of the drive-side holding plate 112. Thus, when the output-side holding plate 130 is axially mounted to the drive-side holding plate 112, the axial rim 112A of the drive-side holding plate 112 fits just inside of the axial rim 130A of the output-side holding plate 130 with the series of teeth 145 engaged into the series of circumferential recesses 146. Additionally, a disk spring 131 is disposed against the output-side holding plate 130 that captures the teeth 145 of the drive-side holding plate 112 in the recesses 146 of the output-side holding plate 130.

In this manner, the axial rim 130A of the output-side holding plate 130 overlaps and reinforces the axial rim 112A of the drive-side holding plate 112 providing a double layered secondary element that is particularly stiff. This double layering of the outer edge of the secondary element (112 and 130) withstands the centrifugal forces generated at the spring mechanism 199 described below without deflection or power loss.

The spring mechanism 199 is disposed between the drive-side holding plate 112 and the output-side holding plate 130 and exerts a damping action parallel to the friction device 182. The spring mechanism 199 includes a series of helical or coil springs 133, 134, 135, 136, 137, 138, 139, 140, 141, 142, 143, and 144 that are arranged, in the circumferential orientation, on the drive-side holding plate 112 between two support brackets 168 and 169. The support brackets 168 and 169 are arranged radially opposite to each other on the drive-side holding plate 112. The coil springs 133, 134, 135, 136, 137, 138, 139, 140, 141, 142, 143, and 144 are held in a series of sliding blocks 116, 117, 118, 119, 120, 121, 122, 123, 124, 125, 126, 127, 128, and 129, which are radially disposed and axially retained within the inside of the axial rim 112A of the drive-side holding plate 112. Furthermore, as shown in FIG. 1A, these sliding blocks are arranged in two spring groups, first 116, 120, 121, 122, 123, 124, and 117, and second 119, 125, 126, 127, 128, 129, and 118. These two groups of coil springs are supported at their end-most sliding blocks 116, 117, 118, and 119 by support brackets 168, 169 of the drive-side holding plate 112 and by corresponding support brackets 170, 171 formed in the output holding plate 130, respectively.

The support brackets 168, 169 of the drive-side holding plate 112 and the support brackets 170, 171 of the output-side holding plate 130 are axially spaced and opposed from one another respectively when the drive-side holding plate 112 and the output-side holding plate 130 are engaged to one another. This allows the support brackets 172 and 173 of the hub plate 113 to operatively move between opposed support brackets 168, 170 and 169, 171 of the holding plates 112 and 130 respectively, when the hub plate 113 (primary element) moves separately from the holding plates 112, 130 (second element).

In operation, with regard to the spring mechanism 199, the hub plate 113 of the torsional damper 100 receives a torque input from an output of a drive device. The hub plate 113 rotates such that one radial edge of each of the hub plate support brackets 172 and 173 comes in contact with the end-most coil spring sliding blocks that are located at the ends of the two spring groups (116 and 118 for example). In response, the spring groups compress while transferring the imparted torque to the opposite end-most sliding blocks (117 and 119 in this example). The opposite end-most sliding blocks (117 and 119) press against the edges of the cooperative supports brackets 168, 169 of the drive-side holding plate 112 and the support brackets 170, 171 of the output-side holding plate 130 thereby causing the drive-side holding plate 112 and the output-side holding plate 130 to rotate. Thus, the secondary element (the drive-side holding plate 112 and the output-side holding plate 130) is driven by the primary element (hub plate 113) through the damping of the spring mechanism 199. Likewise, a reverse action of the spring mechanism 199 occurs to damp a feedback of torque from the secondary element to the primary element when drive torque is removed from the primary element and the secondary element still has continued rotational movement and inertia from the drive train.

Figure 3A:
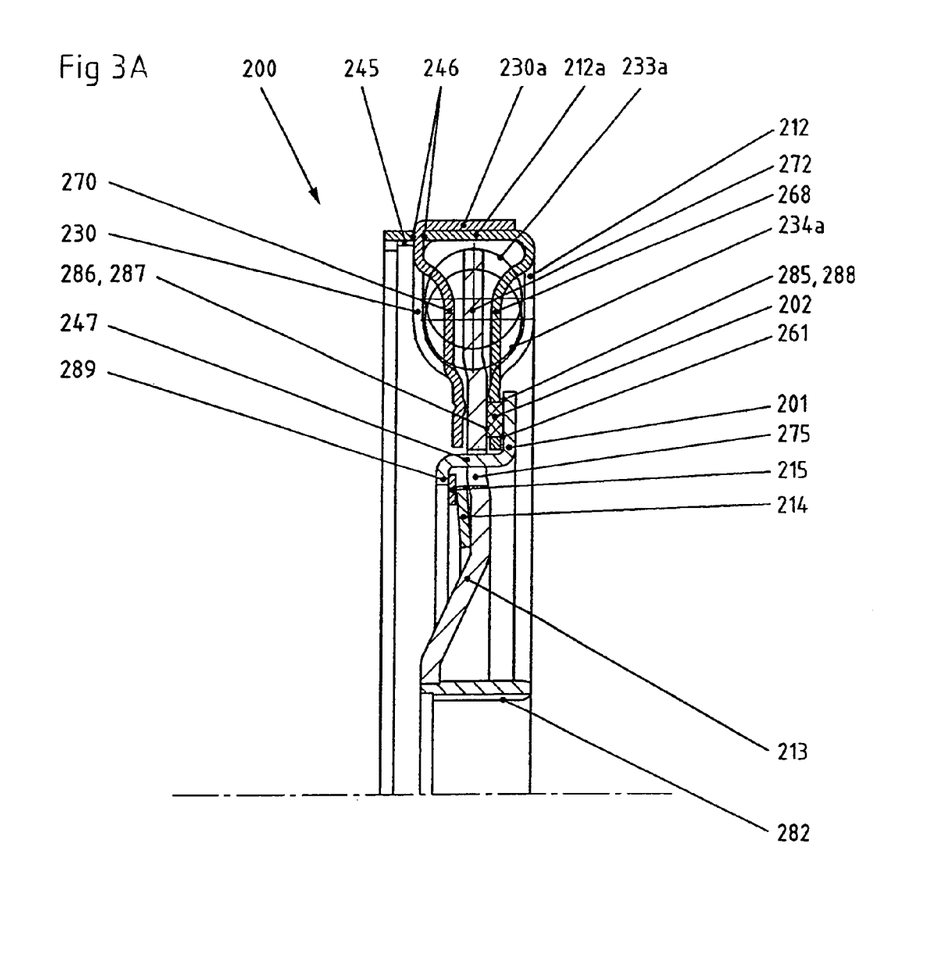
FIG. 3A is a radial half section of the torsional vibration damper shown in FIG. 1A.
Figure 4A:
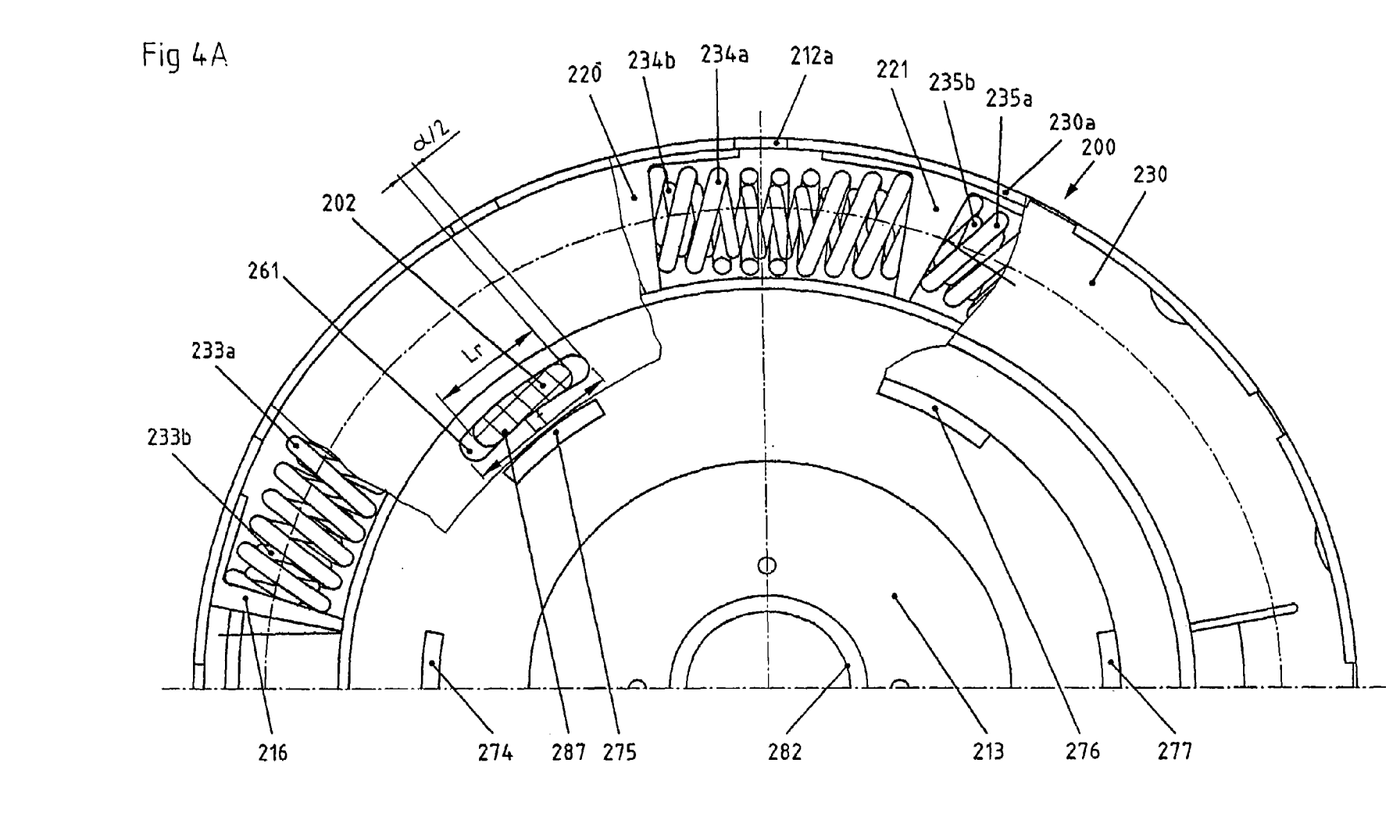
FIG. 4A is an axial half section of the torsional vibration damper shown in FIG. 3A.

Referring now to FIGS. 3A and 4A, where like numerals increased by 100 are used to designate structure like that of FIGS. 1A, 1B, and 2, a second exemplary embodiment of a torsional vibration damper in accordance with the present invention is generally indicated at 200. The torsional vibration damper 200 comprises a drive-side holding plate 212 and an output-side holding plate 230, which together form the secondary element as well as a support plate 201, which forms a primary element together with a hub plate 213. The drive-side holding plate 212 and an output-side holding plate 230 cooperatively engage each other and overlap at their axial rims 212A and 230A. In this manner, a double layer for the secondary element is created by the overlap of 212A and 230A that is particularly stiff and dimensionally stable.

A plurality of friction blocks 202 are provided that are arranged in corresponding apertures 261 and are held in a frictionally engaged manner against the support plate 201 and the hub plate 213 by means of a disk spring 214 and a locking ring 215. The end surfaces 287 and 288 of the friction blocks 202 interact with corresponding friction surfaces 285 and 286 on the support plate 201 and the hub plate 213, respectively. The friction device in this example differs from that in FIGS. 1A, 1B, and 2 in that the apertures 261 are not open on their inner diameter. Thus, the friction blocks 202 do not rest on the axially extending ridges 247 of the support plate 201, but are wholly fit within the slot-shaped apertures 261.

As shown in FIG. 4A, torsional vibration damper 200 also deviates from the first embodiment discussed above by employing a different spring mechanism between the drive-side and output-side holding plates 112 and 130. The spring-elastic coupling provided in this example between the sliding blocks 216, 220, 221 is not accomplished using simple coil springs, but rather a coaxially arranged coil-spring pair, consisting of exterior springs 233*a*, 234*a*, 235*a* and interior springs 233*b*, 234*b*, 235*b* as shown. Additionally, FIG. 4A illustrates a rotationally neutral position with regard to the position of the friction block 202 within the aperture 216. The friction block 202 having a length $L_r$ that is smaller that the aperture length $L_f$ such that the clearance angle α is indicated as "α/2" on each side of the friction block 202.

Figure 3B:
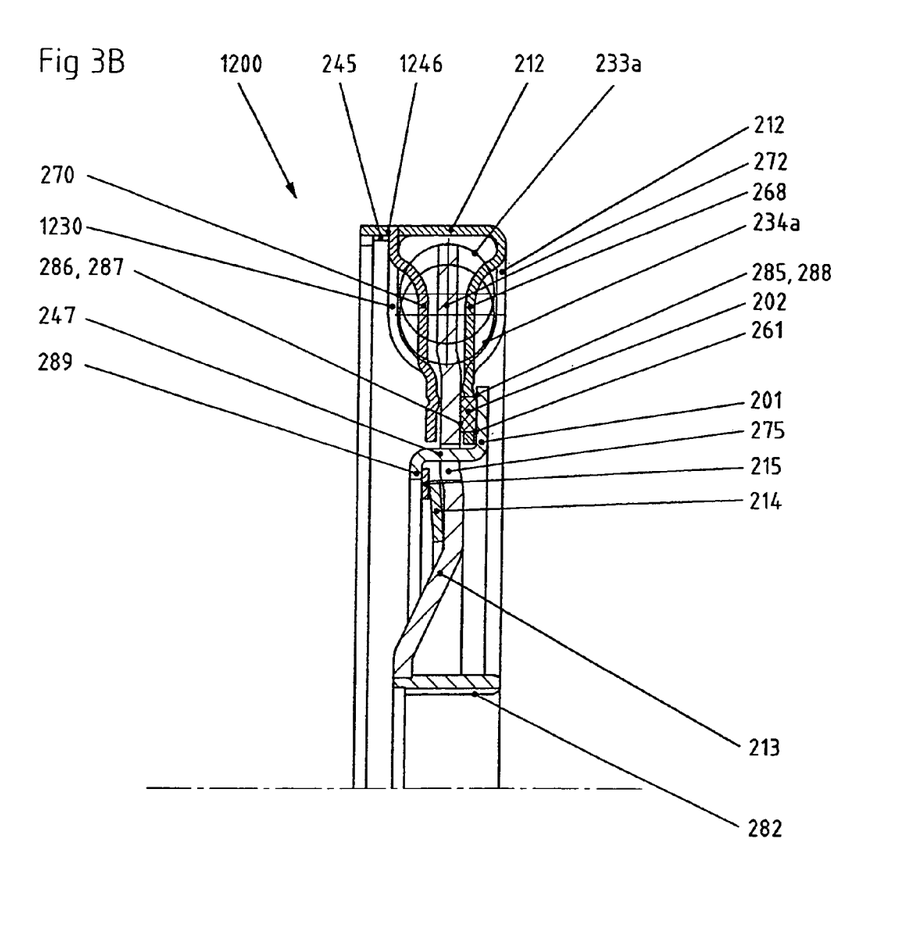
FIG. 3B is a radial half section of a torsional vibration damper.
Figure 4B:
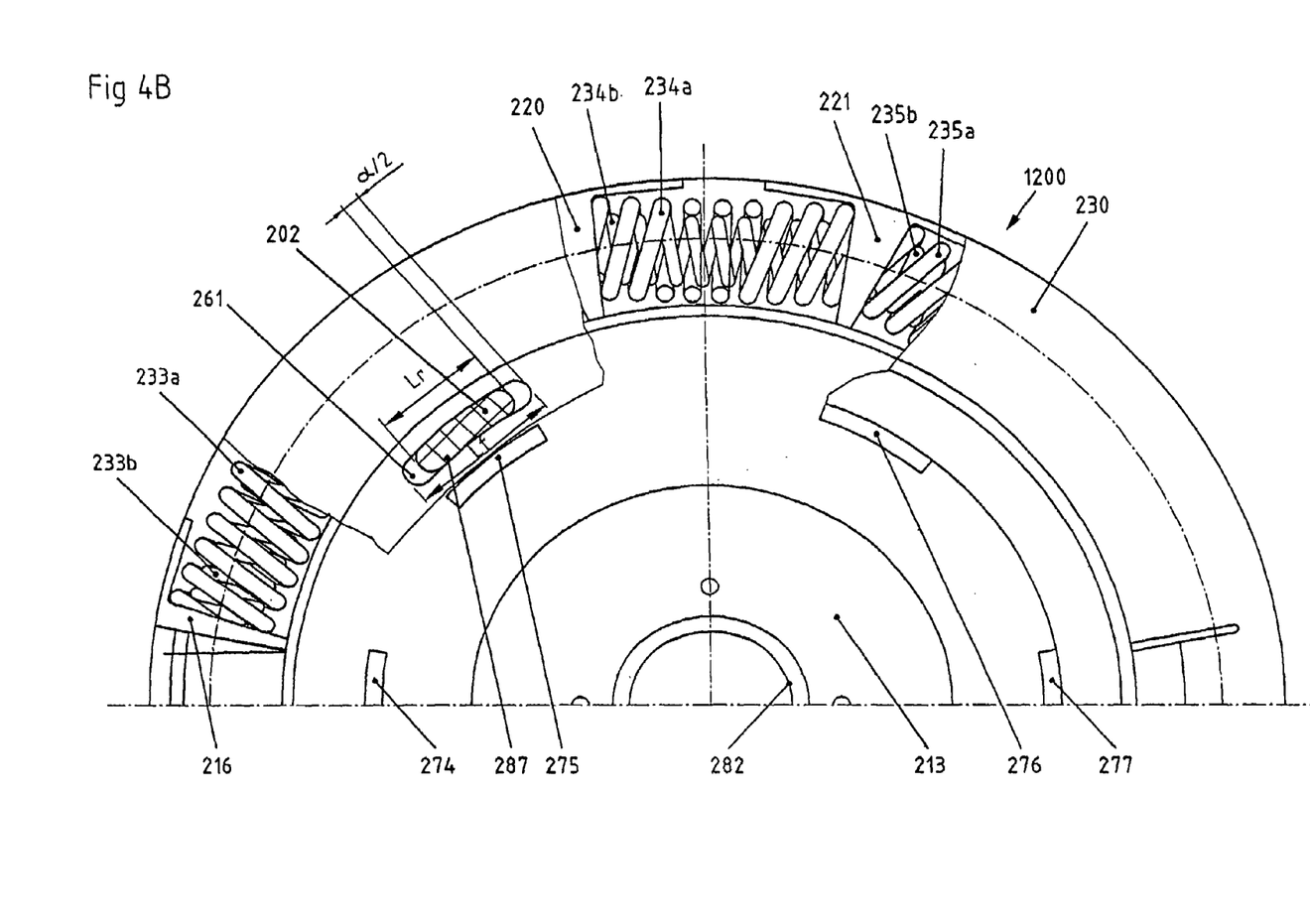
FIG. 4B is an axial half section of the torsional vibration damper shown in FIG. 3B.

FIGS. 3B and 4B illustrate a torsion-vibration damper generally indicated at 1200, having a friction device that is similar to that illustrated in FIGS. 3A and 4A. The torsional-vibration damper 1200 is illustrated and described in greater detail in applicant's co-pending application, having U.S. Ser. No. 10/886,180, entitled "Torsional-Vibration Damper" and filed on the same date as this application. The disclosure of this application is incorporated herein by reference. The torsional-vibration damper 1200 employs an output-side holding plate 1230 that does not have an axial ridge. As shown in FIG. 3B, the output-side holding plate 1230 includes radial teeth 1246 that operatively engage the axial teeth 245 of the drive-side holding plate 212.

Figure 5:
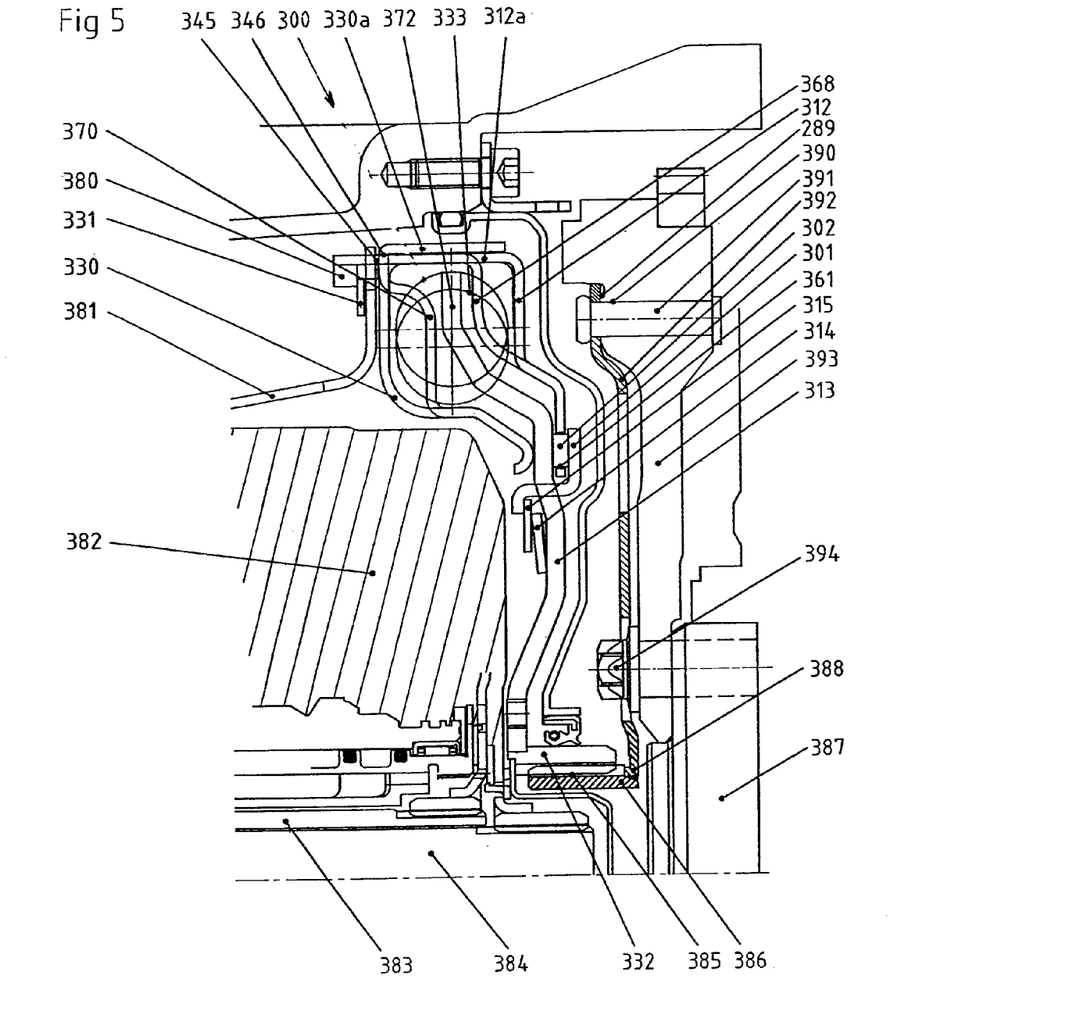
FIG. 5 is a radial half section of another embodiment of a torsional vibration damper of the present invention.

Referring now to FIG. 5, where some reference numerals have been increased by 200 to designate structure like illustrated in FIGS. 1A, 1B, and 2, a third exemplary embodiment of a torsional vibration damper in accordance with the present invention is generally indicated at 300. The torsional vibration damper 300 comprises a drive-side holding plate 312 and an output-side holding plate 330, which together form the secondary element as well as a support plate 301, which forms a primary element together with a hub plate 313. The torsional oscillation damper 300 includes a friction device that has a plurality of friction blocks 302. The drive-side holding plate 312 and an output-side holding plate 330 cooperatively engage each other and overlap at their axial rims 312A and 330A. In this manner, a double layer for the secondary element is created by the overlap of 312A and 330A that is particularly stiff and dimensionally stable.

The torsional vibration damper 300 illustrated in FIG. 5 is employed with a twin clutch power transmission device 382. A crankshaft 387, which is a component of a prime mover (not shown), provides motive power and is operatively connected by bolts 394 to a flywheel 393. The flywheel 393 is connected to the primary element 313 of the torsional oscillation damper 300 through an uncoupling element 392 in the form of a swash plate. The swash plate 392 is connected to the flywheel 353 at a raised ridge 289. The connection is accomplished by a number of fixing apertures 390, which retain rivets 391. The swash plate 392 is connected to an inner hub 386 by a splined connection 388. The inner hub 386 is further connected to an outer hub 332, which is fixed to the hub plate 312, by a splined connection 385.

A secondary element (312 and 330) of the torsional oscillation damper 300 is connected to the primary element by a plurality of coil springs 333 that are arranged on the outer circumference and damp any torsional oscillation. The secondary element is attached to a clutch housing 381 of the twin clutch 382 device. The twin clutch device 382 is designed so as to connect the clutch housing 381 to a first transmission ingoing shaft 383, in the present case a hollow shaft 383, or to a second ingoing transmission shaft 384, in the present case a central shaft 384.

Figure 6:
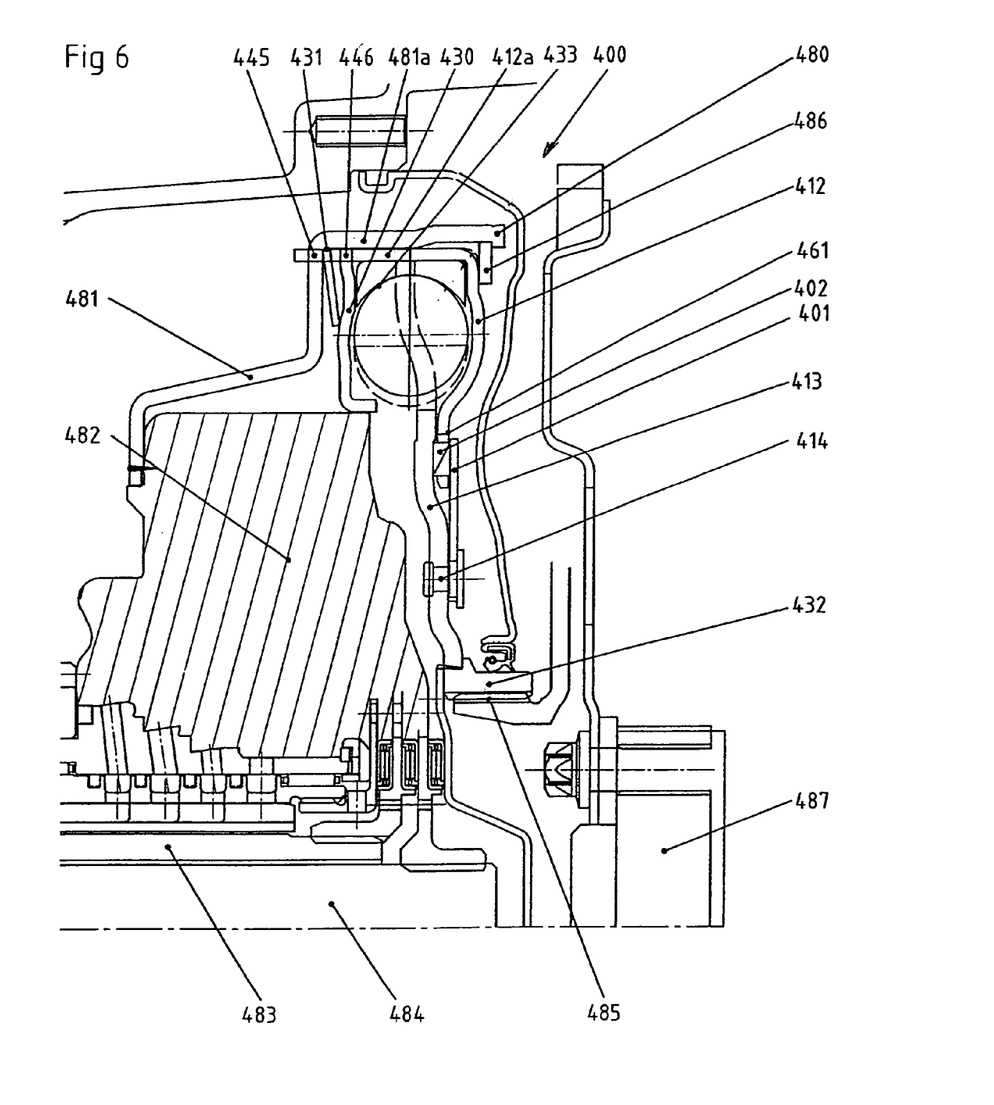
FIG. 6 is a radial half section of another embodiment of a torsional vibration damper of the present invention.

Referring now to FIG. 6, where some reference numerals have been increased by 200 to designate structure like that illustrated in FIGS. 1A, 1B, and 2, another exemplary embodiment of a torsional vibration damper in accordance with the present invention is generally indicated at 400. Similarly, as in the preceding design example, the torsional oscillation damper 400 is connected, on the ingoing side, with a crankshaft 487 of a prime mover (not shown). On the output side, it is connected to a transmission with two ingoing transmission shafts 483, 484 through a clutch housing 481 of a twin clutch device 482. The torsional oscillation damper 400 includes a primary element having hub plate 413 that is coupled through a front-end hub 432 having a splined connection 435 to an ultimate connection with the crankshaft 487. Furthermore, the torsional oscillation damper 400 also has a secondary element that is connected to the primary element in a swiveling and elastic manner. The secondary element includes a drive-side holding plate 412 and an output-side holding plate 430. Furthermore, the torsional oscillation damper 400 includes a friction device that has a plurality of friction blocks 402.

The torsional vibration damper 400 deviates from the previous exemplary embodiments by employing a different output-side holding plate 430. In this case, the output-side holding plate 430 does not have an axial rim, but has radially extending teeth 446 that cooperatively engage the axially extending teeth 445 on the axial rim 412A of the drive-side holding plate 412. In order to design the torsional oscillation damper 400 to be resilient to centrifugal forces, and to transmit the torque to the clutch even at a high rotational speed, the clutch housing 481 envelops the drive-side holding plate 412, which is designed as a shell. Section 481A of the clutch housing 481 envelops the drive-side holding plate 412 in section 412A to provide an essentially positive connection. In this manner, a double layer for the secondary element is created by the overlap of 412A and 481A that is particularly stiff and dimensionally stable.

In the axial direction, the shells 412, 430, and 481 are fixed by a plate spring 431 that is introduced between two radial surfaces of the clutch housing 481 and the sheet-metal support 430. The plate spring is held by means of a locking ring 486, which is inserted between a lip 480 that is provided at the end on the clutch housing 481 and the radial surface of the sheet-metal support 412. The clutch housing 481 also engages the axial teeth 445 of the drive-side holding plate 412. The torsional-vibration damper 400 also deviates from the embodiments described above by having a support plate 401 that is essentially flat and that is mounted to the hub plate 413 by rivets 414.

Figure 7:
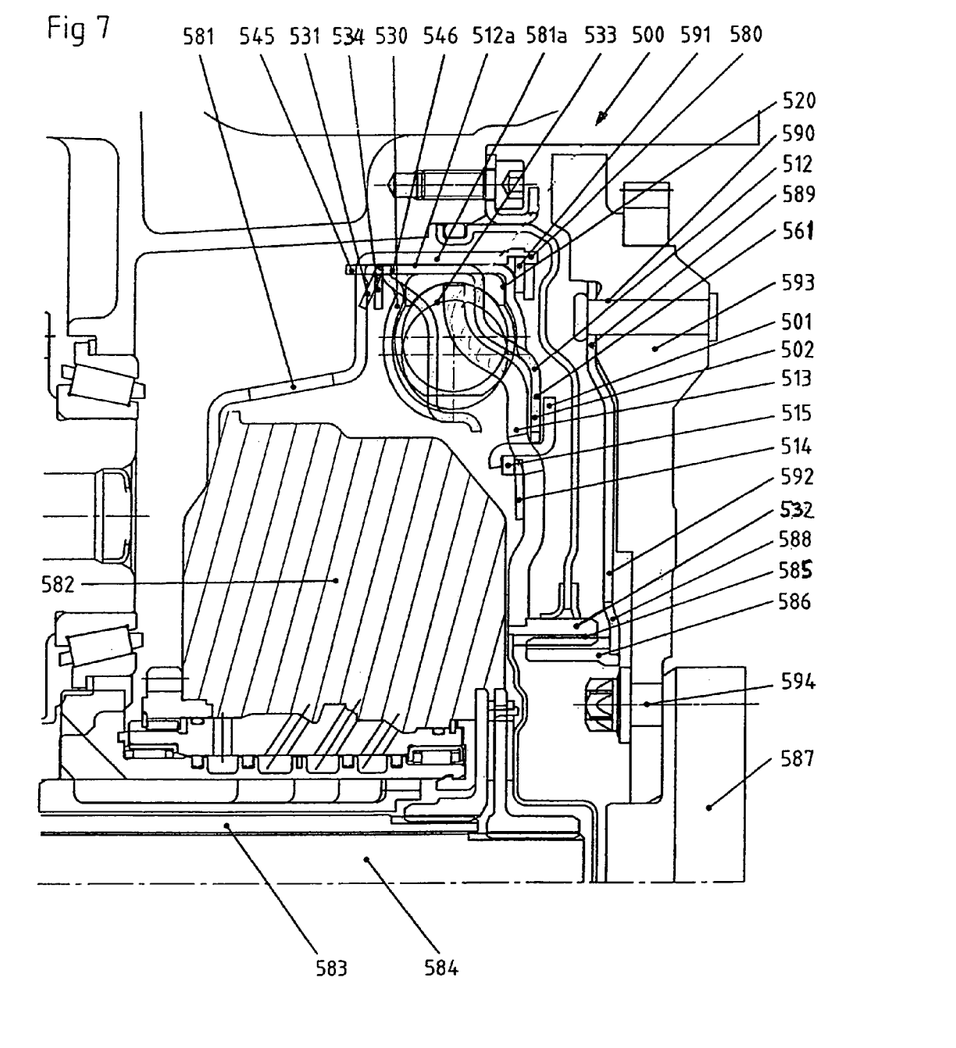
FIG. 7 is a radial half section of still another embodiment of a torsional vibration damper of the present invention.

Referring now to FIG. 7, where some reference numerals have been increased by 400 to designate structure like that illustrated in FIGS. 1A, 1B, and 2, still another exemplary embodiment of a torsional vibration damper in accordance with the present invention is generally indicated at 500. On the drive-side, the torsional oscillation damper 500 is connected, through its hub plate 513, a first hub 532, a splined connection 585, and a second hub 586, to a swash plate 592 having an inner wheel 588 and an outer wheel 589. The connection to the swash plate 592 is accomplished by a number of fixing apertures and rivets 590. On the output side, the torsional oscillation damper 500 is mounted to the clutch housing 581 of a twin clutch 582 having two input transmission shafts 583, 584.

The torsional oscillation damper 500 includes a primary element having a hub plate 513 and support plate 501. Furthermore, the torsional oscillation damper 500 also has a secondary element which forms the output and which is connected to the primary element in a swiveling and elastic manner. The secondary element includes by a drive-side holding plate 512 and an output-side holding plate 530. Furthermore, the torsional oscillation damper 500 includes a friction device that has a plurality of friction blocks 502.

In order to design the torsional oscillation damper 500 to be resilient to centrifugal forces, and to transmit the torque to the clutch even at a high rotational speed, the clutch housing 581 envelops the drive-side holding plate 512, which is designed as a shell. Section 581a of the clutch housing 581 envelops the drive-side holding plate 512 in section 512a to provide an essentially positive connection. The thus arising double layer 512a, 581a made of metal is particularly stiff and dimensionally stable.

In the axial direction, the shells 512, 530, and 581 are fixed by a plate spring 531 that is introduced between two radial surfaces of the clutch housing 581 and the sheet-metal support 530. The plate spring is held by means of a locking ring 534. The clutch housing 581 is further held to the second element (512 and 530) by a second locking ring 591, which is inserted between a support bracket 580 provided at the end on the clutch housing 581 and a radial surface of the sheet-metal support 512. The clutch housing 581 also engages the axial teeth 545 of the drive-side holding plate 512.

The torsional vibration damper 100, 200, 300, 400 and 500, having the double layering of the members of the secondary element provides a particularly stiff and dimensionally stable secondary element that is able to withstand the generated centrifugal forces and is inexpensive to produce. In addition, the friction device of the torsional vibration damper of the present invention requires few separate components and is simple and inexpensive to produce.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A torsional-vibration damper rotatably supported for translating torque between a power take-off of a prime mover and an input of a transmission, said torsional-vibration damper comprising:
   a primary element operatively connected for rotation with the power take-off of the prime mover;
   a secondary element operatively connected for rotation with the input of the transmission;
   a spring mechanism operatively disposed between said primary element and said secondary element and adapted to operatively couple said primary element to said secondary element in a damped-torque translational relationship; and
   a friction device having a plurality of fiction blocks that are each operatively supported between said primary element and said secondary element such that said friction blocks frictionally join said primary element with said secondary element;
   said secondary element including an output-side holding plate and a drive-side holding plate, said output-side holding plate being mounted to said drive-side holding plate such that said output-side holding plate and said drive-side holding plate operatively encompass said primary element and provide radial support for said spring mechanism, said output-side holding plate further including a first axial rim and a series of circumferential recesses formed radially inside of said first axial rim and said drive-side holding plate further including a second axial rim having a series of teeth complementary to said series of circumferential recesses, wherein said second axial rim fits inside said first axial rim with said series of teeth engaged into said series of circumferential recesses when said output-side member is mounted to said drive-side member such that said first axial rim overlaps and reinforces said second axial rim to provide a double-layered said secondary element that is substantially stiff and substantially withstands centrifugal forces generated at said spring mechanism without deflection or power loss.

2. A torsional-vibration damper as set forth in claim 1, wherein said drive-side holding plate further includes a plurality of apertures adapted to receive and retain said plurality of friction blocks.

3. A torsional-vibration damper as set forth in claim 2, wherein said plurality of friction blocks are the same length with respect to each other and said plurality of apertures are the same length with respect to each other.

4. A torsional-vibration damper as set forth in claim 1, wherein said friction device further includes a support plate having a plurality of axially extending ridges, said support plate being mounted to said drive-side holding plate such that said plurality of axially extending ridges fit within and extend axially beyond said drive-side holding plate such that said plurality of friction blocks are operatively disposed upon said axially extending ridges.

5. A torsional-vibration damper as set forth in claim 4, wherein said primary element is a hub plate, said hub plate and said support plate having friction surfaces with said plurality of friction blocks captured therebetween such that said friction surfaces frictionally interact with said friction blocks.

6. A torsional-vibration damper as set forth in claim 5, wherein said plurality of axially extending ridges of said support plate are turned radially inward at their ends to form radial support ridges and said hub plate further includes a plurality of slotted apertures adapted to receive said radial support ridges, said support plate further including a biasing member adapted to be fitted within said radial support ridges such that said biasing member causes said hub plate to be axially biased toward said support plate such that said friction surfaces frictionally interact with said friction blocks.

7. A torsional-vibration damper as set forth in claim 1, wherein said primary element is operatively disposed within said drive-side holding plate and said spring mechanism is disposed between said output-side holding plate and said drive-side holding plate such that said spring mechanism is radially disposed and axially retained within an inside of said second axial rim.

8. A torsional-vibration damper as set forth in claim 1, wherein said secondary element further includes a disk spring that is disposed against said output-side holding plate and captures said series of teeth of said second axial rim in said series of circumferential recesses of said first axial rim.

\* \* \* \* \*